US007417765B2

(12) United States Patent
Araki

(10) Patent No.: US 7,417,765 B2
(45) Date of Patent: Aug. 26, 2008

(54) IMAGE PROCESSING APPARATUS AND METHOD, IMAGE PROCESSING PROGRAM, AND STORAGE MEDIUM

(75) Inventor: Tadashi Araki, Kanagawa-ken (JP)

(73) Assignee: Ricoh Company, Ltd., Kanagawa-Ken (JP)

( * ) Notice: Subject to any disclaimer, the term of this patent is extended or adjusted under 35 U.S.C. 154(b) by 859 days.

(21) Appl. No.: 10/803,912

(22) Filed: Mar. 19, 2004

(65) Prior Publication Data

US 2004/0201870 A1 Oct. 14, 2004

(30) Foreign Application Priority Data

Mar. 19, 2003 (JP) .............................. 2003-076389
Jun. 11, 2003 (JP) .............................. 2003-167090

(51) Int. Cl.
*H04N 1/409* (2006.01)
*H04N 1/053* (2006.01)
*G06T 5/00* (2006.01)
*G03B 27/32* (2006.01)

(52) U.S. Cl. ...................... 358/1.9; 358/3.26; 358/488; 382/275; 382/286; 382/293; 355/25

(58) Field of Classification Search .................. 358/1.9, 358/473–475, 486, 449, 464, 3.26, 488; 382/284–290, 171, 177, 203, 275, 293; 399/362; 355/25

See application file for complete search history.

(56) References Cited

U.S. PATENT DOCUMENTS

| | | | |
|---|---|---|---|
| 5,276,533 A | | 1/1994 | Shimizu et al. |
| 5,362,958 A | | 11/1994 | Ando |
| 5,583,662 A | * | 12/1996 | Takahashi et al. ........... 358/474 |
| 5,969,829 A | * | 10/1999 | Matsuda et al. ............ 358/475 |
| 5,987,163 A | * | 11/1999 | Matsuda ...................... 382/154 |
| 6,035,061 A | * | 3/2000 | Katsuyama et al. ......... 382/177 |
| 6,256,411 B1 | * | 7/2001 | Iida ............................. 382/203 |
| 6,330,050 B1 | * | 12/2001 | Takahashi et al. ............. 355/25 |
| 7,072,527 B1 | * | 7/2006 | Nako ........................... 382/290 |
| 2003/0142884 A1 | * | 7/2003 | Cariffe ....................... 382/285 |

FOREIGN PATENT DOCUMENTS

| | | |
|---|---|---|
| EP | 1 032 191 A2 | 8/2000 |
| EP | 1 215 881 A1 | 6/2002 |
| JP | 07-272282 | 10/1995 |

(Continued)

*Primary Examiner*—Mark Zimmerman
*Assistant Examiner*—Charlotte M Baker
(74) *Attorney, Agent, or Firm*—Dickstein Shapiro LLP

(57) ABSTRACT

An image processing apparatus which includes an image reading apparatus comprising a first memory, a book image corrector, and a selector. The first memory stores optical positioning information of the image reading apparatus. The book image corrector performs an image correction based on reference data from an image read by the image reading apparatus when the image is of a book document. The selector selects one of the plurality of different correction modes of the second corrector based on the optical positioning information stored in the first memory. The book image corrector includes a first corrector configured to correct in a main scanning direction a distortion of the image of the book document based on the reference data and a second corrector having a plurality of different correction modes configured to correct a distortion of the image of the book document in a sub-scanning direction.

50 Claims, 17 Drawing Sheets

FOREIGN PATENT DOCUMENTS

| | | |
|---|---|---|
| JP | 08-153342 | 6/1996 |
| JP | 2002-056608 | 2/2002 |
| JP | 2002-117548 | 4/2002 |
| JP | 2002-247643 | 8/2002 |
| JP | 2002-358514 | 12/2002 |

* cited by examiner

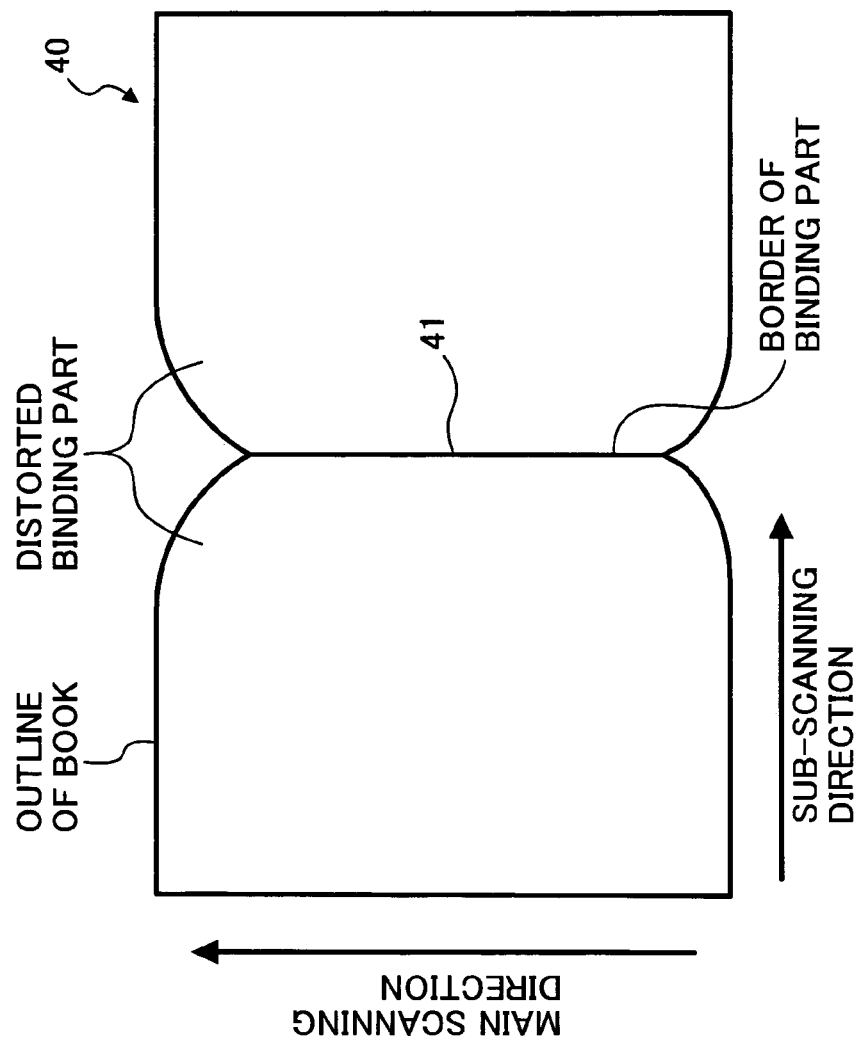

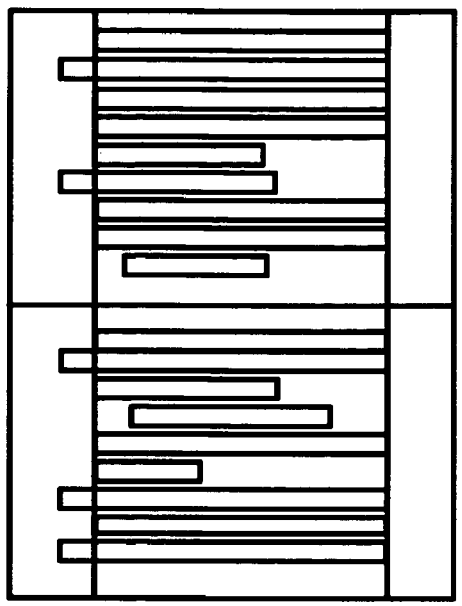
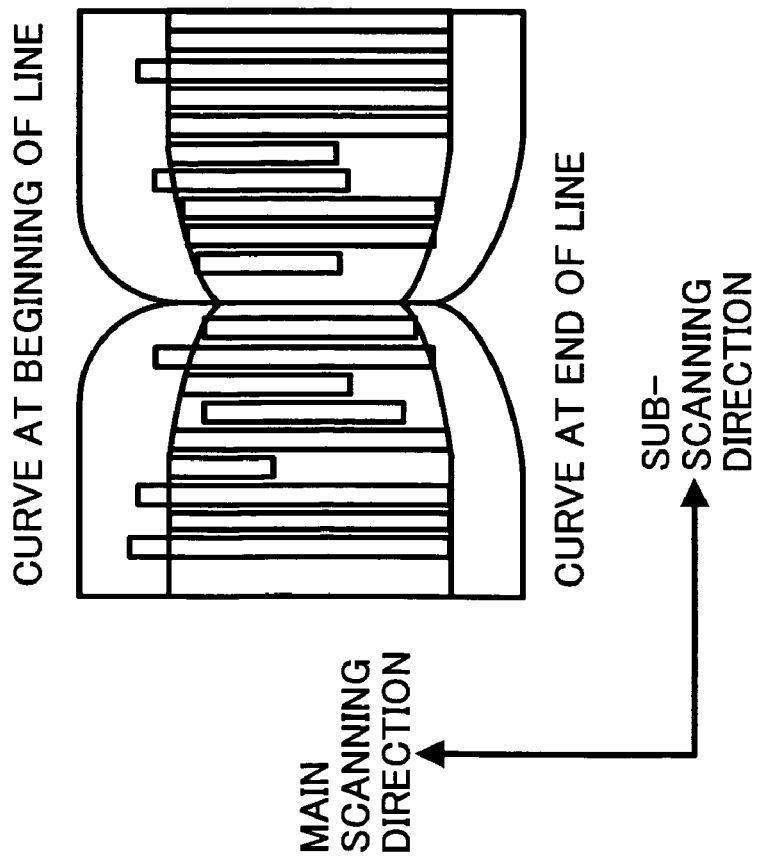

IMAGE PROCESSING APPARATUS AND METHOD, IMAGE PROCESSING PROGRAM, AND STORAGE MEDIUM

This patent specification is based on Japanese patent applications, No. 2003-076389 filed on Mar. 19, 2003 and No. 2003-167090 filed on Jun. 11, 2003 in the Japanese Patent Office, which are hereby incorporated by reference in its entirety.

FIELD OF THE INVENTION

The present invention relates to an image processing apparatus, and more particularly, to an apparatus for correcting distortion of scanning an image of a page into a photocopier or scanner when the page cannot be laid flat on a scanning bed.

BACKGROUND OF THE INVENTION

When a flat bed scanner is used to scan bindings of thick documents such as a book and a magazine as shown in FIG. 1, a binding portion 41 of a book document 40 is scanned such that the binding portion 41 cannot be laid flat on a contact glass 2 of an image reading apparatus 1. In FIG. 1, the binding portion 41 of the book document 40 is laid on the contact glass 2 substantially in parallel to a main scanning direction. When the binding portion 41 of the book document 40 rises above the contact glass 2, the binding portion 41 is away from a focal point of the scanner, so that both ends of a binding boundary line of the book document 40 are distorted and a scanned image shrinks in the main scanning direction and sub-scanning directions as shown in FIG. 2.

As shown in FIG. 1, the image reading apparatus 1, configured as part of a digital copier 16, includes a pivotable platen 17 and a sensor 18. The platen 17 contacts a document to the contact glass 2. The sensor 18 detects an opening and closing of the platen 17. A document scale 11 determines a position for placing a document and adjusts the contact glass 2.

As shown in FIG. 2, various technologies are proposed for correcting a distortion by expanding a distorted, scanned image in main and sub-scanning directions.

Japanese Laid-Open Patent Publication No. 2002-358514 describes a method for checking curvatures of straight lines such as a book outline (i.e., a page outline), a ruled line, and a character line in a document, measuring a magnification for correcting the curvatures to original straight lines, and expanding the curvatures in the main scanning direction.

In a correction in the sub-scanning direction, when a location in the main scanning direction of an optical axis passing through a center of a lens of a scanner and a distance from the lens to a contact glass are determined, a distance from the contact glass 2 to a height of the book document 40 is determined so that a three dimensional position is identified. Using information about the three dimensional position allows for expanding in the sub-scanning direction.

In addition, Japanese Laid-Open Patent Publication No. 2002-247643 describes a method for use in a ratio of a rectangular width and height circumscribing a character in a scanned image when a location in the main scanning direction of an optical axis passing through a center of a lens of a scanner and a distance from the lens to a contact glass are not determined.

Presently, the above-mentioned techniques, however, possess their own distinct disadvantages. Users who require a distortion correction cannot perform a process of a correction, causing a longer processing time and a lower correction image quality. In addition, after the process of correction is completed, a corrected image often has a different size from an original document.

SUMMARY OF THE INVENTION

In one embodiment, a novel image processing apparatus which includes an image reading apparatus includes a first memory a book image corrector, and a selector. The first memory stores optical positioning information of the image reading apparatus. The book image corrector performs an image correction based on reference data from an image read by the image reading apparatus when the image is of a book document. The selector selects one of the plurality of different correction modes of the second corrector based on the optical positioning information stored in the first memory. The book image corrector includes a first corrector and a second corrector. The first corrector corrects in a main scanning direction a distortion of the image of the book document based on the reference data. The second corrector having a plurality of different correction modes corrects a distortion of the image of the book document in a sub-scanning direction.

The reference data may include a page outline, a ruled line, and a character line.

The book document may be laid on the image reading apparatus such that a binding portion of the book document is parallel to the main scanning direction.

The plurality of different correction modes may include a first mode and a second mode. The first mode may correct a rising amount of an image portion of the image of the book document in a vicinity of the binding portion. The second mode may extract a character circumscribing rectangle from the image of the book document and correct the distortion based on a rectangle aspect ratio of the character circumscribing rectangle. The selector may select the first mode when the optical positioning information is stored in the first memory and the second mode when the optical positioning information is not stored in the first memory.

The image processing apparatus may further include a second memory storing a user selection mode. In the image processing apparatus, the selector may select another one of the plurality of different correction modes which does not perform a distortion correction when the optical positioning information is not stored in the first memory.

The image processing apparatus may further include a second memory storing a user selection mode. In the image processing apparatus, the selector may select a different one of the plurality of different correction modes which does not perform a correction of the distortion in the sub-scanning direction, regardless of whether the optical positioning information is stored in the first memory.

Further, in one embodiment, a novel image processing apparatus which includes an image reading apparatus includes an image designating mechanism, a reference data extractor, and a book image corrector. The image designating mechanism designates a type of image of book document from the image reading apparatus. The reference data extractor extracts reference data obtained by the image of the book document. The book image corrector extracts reference data from an image read by the image reading apparatus, analyzes the image, and performs an image correction when the image is determined as an image of a book document according to an analysis result. The book image corrector includes a first corrector and a second corrector. The first corrector corrects in a main scanning direction a distortion of the image of the book document based on the reference data extracted from the image of the book document. The second corrector having a plurality of different correction modes corrects a distortion of the image of the book document in a sub-scanning direction. In the image processing apparatus, the reference data extractor extracts the reference data based on the type of image designated by the image designating mechanism.

The reference data may include a page outline, a ruled line, and a character line.

The book document may be laid on the image reading apparatus such that a binding portion of the book document is parallel to the main scanning direction.

The reference data extractor may extract the ruled line and the character line other than the page outline as the reference data when the image designating mechanism designates a binary image.

Further, in one embodiment, a novel image processing apparatus which includes an image reading apparatus reading a book document having a binding portion includes an image distortion corrector and an image adjustor. The image distortion corrector performs a distortion correction of an image of a book document read by the image reading apparatus. The image adjustor adjusts an image of the book document after the process of the distortion correction is completed.

The book document may be laid on the image reading apparatus such that a binding portion of the book document is parallel to the main scanning direction.

The image adjustor may centrally align the binding portion of the book document to the image after the process of the distortion correction is completed.

The image adjustor may equally adjust a size of the corrected image to a size of the book document.

The image adjustor may centrally align the binding portion of the corrected image and equally adjust a size of an output image to the book document.

The image processing apparatus may further include an instructing mechanism which instructs an adjustment of a corrected image. In the image processing apparatus, the image adjustor may adjust the image based on an instruction of the instructing mechanism.

Further, in one embodiment, a novel image processing method includes the steps of storing, reading, extracting, analyzing, selecting, and performing. The storing step stores optical positioning information of an image reading apparatus. The reading step reads an image of a book document. The extracting step extracts reference data from an image read by the reading step. The analyzing step analyzes the image. The selecting step selects one of a plurality of different correction modes based on the optical positioning information stored in the storing step. The performing step performs an image correction when the image is determined as an image of a book document according to an analysis result performed by the analyzing step. In the image processing method, the performing step includes the steps of first correcting and second correcting. The first correcting step corrects in a main scanning direction a distortion of the image of the book document based on the reference data extracted from the image of the book document. The second correcting step corrects a distortion of the image of the book document in a sub-scanning direction.

The reference data may include a page outline, a ruled line, and a character line.

The book document may be laid on the image reading apparatus such that a binding portion of the book document is parallel to the main scanning direction.

The plurality of different correction modes may include a first mode and a second mode. The first mode may correct a rising amount of an image portion of the image of the book document in a vicinity of the binding portion. The second mode may extract a character circumscribing rectangle from the image of the book document and correct the distortion based on a rectangle aspect ratio of the character circumscribing rectangle. The selecting step may select the first mode when the optical positioning information is stored in the storing step and the second mode when the optical positioning information is not stored in the storing step.

The image processing method may further include a memorizing step of storing a user selection mode. In the image processing method, the selecting step selects another one of the plurality of different correction modes which does not perform a distortion correction when the optical positioning information is not stored in the storing step.

The image processing method may further include a memorizing step of storing a user selection mode. The selecting step may select a different one of the plurality of different correction modes which does not perform a correction of the distortion in the sub-scanning direction, regardless of whether the optical positioning information is stored in the storing step.

Further, in one embodiment, a novel image processing method includes the steps of designating, reading, extracting, selecting, and performing. The designating step designates a type of image of book document from an image reading apparatus. The reading step reads an image of the book document. The extracting step extracts reference data obtained by the image of the book document. The selecting step selects one of a plurality of different correction modes based on the optical positioning information stored in the storing step. The performing step performs an image correction when the image is of a book document. The performing step includes the steps of first correcting and second correcting. The first correcting step corrects in a main scanning direction a distortion of the image of the book document based on the reference data extracted from the image of the book document. The second correcting step corrects a distortion of the image of the book document in a sub-scanning direction. The extracting step may extract the reference data based on the type of image designated by the designating step.

The reference data may include a page outline, a ruled line, and a character line.

The book document may be laid on the image reading apparatus such that a binding portion of the book document is parallel to the main scanning direction.

The extracting step may extract the ruled line and the character line other than the page outline as the reference data when the image designating mechanism designates a binary image.

Further, in one embodiment, a novel image processing method includes the steps of performing and adjusting. The performing step performs a distortion correction of an image of a book document read by an image reading apparatus. The adjusting step adjusts an image of the book document after the process of the distortion correction is completed.

The book document may be laid on the image reading apparatus such that a binding portion of the book document is parallel to the main scanning direction.

The adjusting step may centrally align the binding portion of the book document to the image after the process of the distortion correction is completed.

The adjusting step may equally adjust a size of the corrected image to a size of the book document.

The adjusting step may centrally align the binding portion of the corrected image and equally adjust a size of an output image to the book document.

The image processing method may further include an instructing step of instructing an adjustment of a corrected image. The adjusting step may adjust the image based on an instruction of the instructing step.

Further, in one embodiment, a novel program of an image correction causing a computer to execute an image correction according to a method includes the steps of storing, reading, extracting, analyzing, selecting, and performing. The storing step stores optical positioning information of an image reading apparatus. The reading step reads an image of a book document. The extracting step extracts reference data from an image read by the reading step. The analyzing step analyzes the image. The selecting step selects one of a plurality of different correction modes based on the optical positioning information stored in the storing step. The performing step performs an image correction when the image is determined as an image of a book document according to an analysis result performed by the analyzing step. The performing step includes the steps of first correcting and second correcting. The first correcting step corrects in a main scanning direction a distortion of the image of the book document based on the reference data extracted from the image of the book document. The second correcting step corrects a distortion of the image of the book document in a sub-scanning direction.

Further, in one embodiment, a novel computer readable medium storing a program makes it possible to perform image correction in an efficient manner by executing the method according to any one of the embodiments described above.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, in which:

FIG. 2 is an explanatory view of a distorted portion of a scanned image;

FIGS. 4A and 4B are schematic views illustrating when a horizontal line is extracted from a vertically written character and a correction in a main scanning direction is performed;

DETAILED DESCRIPTION OF PREFERRED EMBODIMENTS

Figure 1:
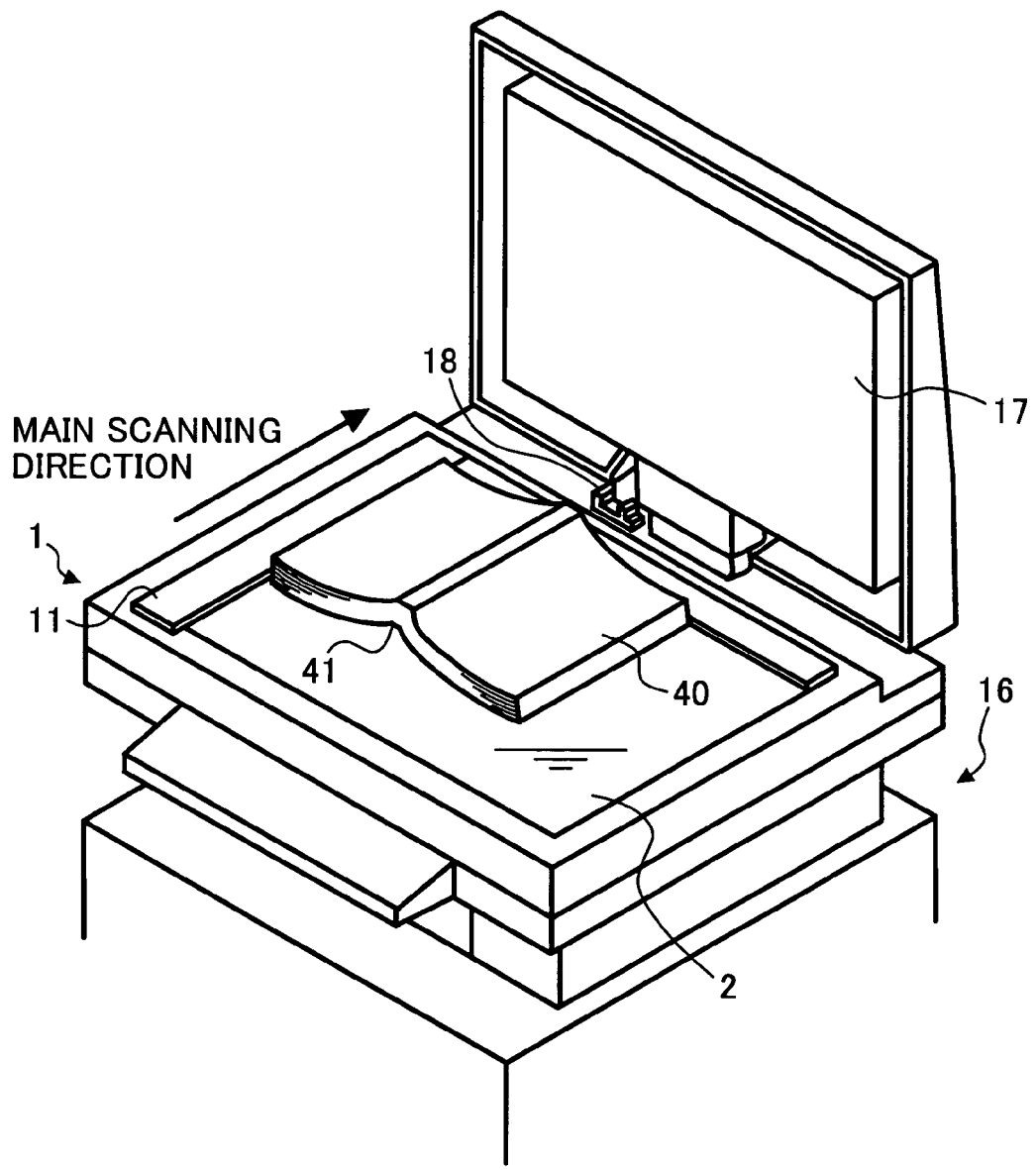
FIG. 1 is a perspective view of a scanned book document.

In describing the preferred embodiments illustrated in the drawings, specific terminology is employed for the sake of clarity. However, the disclosure of this patent specification is not intended to be limited to the specific terminology selected, and it is to be understood that each specific element includes all technical equivalents that operate in a similar manner. Referring now to the drawings, wherein like reference numerals designate identical or corresponding parts throughout the several views, particularly to FIGS. 3A and 3B, an exemplary image correction according to a preferred embodiment of the present invention is now described.

Figure 3B:
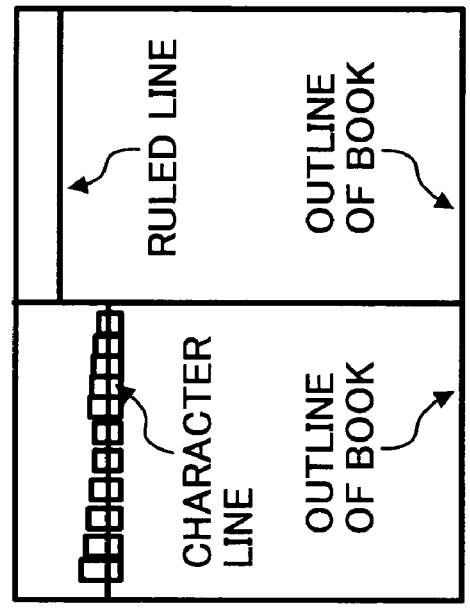
FIGS. 3A and 3B are schematic views illustrating a correction of a distorted and scanned image of a booklet in a main scanning direction according to the present invention.
Figure 3A:
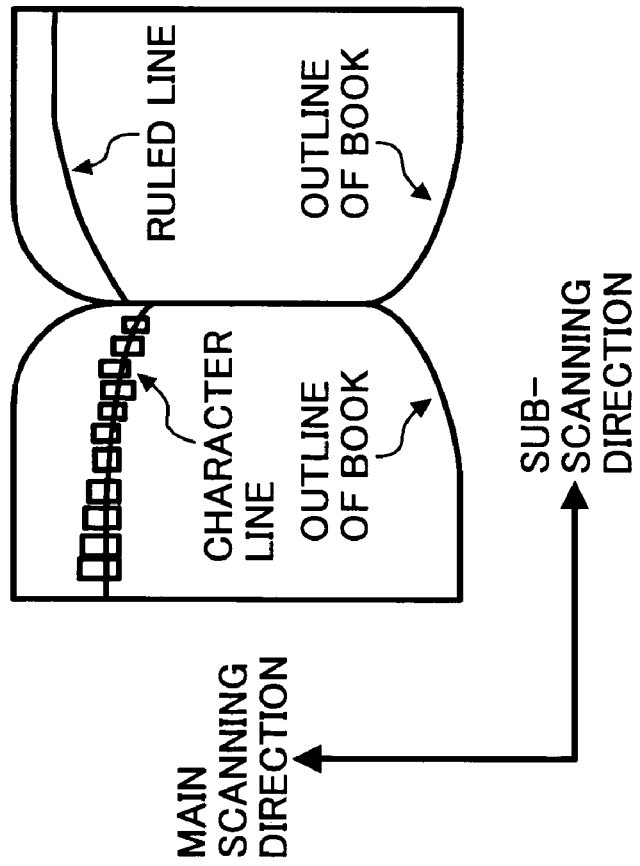

FIGS. 3A and 3B are schematic views illustrating a correction of a distorted and scanned image of a booklet in a main scanning direction.

An image scanned by an image reading apparatus 101 (FIG. 9) generally includes a page contour (i.e., an outline), a ruled line, and a horizontally written character. The page outline is sometimes not clearly scanned depending on an open or closed status of a platen and the placement of a document. In addition, a ruled line is not always included in the document. However, a horizontal line in the document is a strong clue to correct a distortion.

When a curved horizontal line as shown in FIG. 3A or a horizontal virtual line such as a character line is corrected as shown in FIG. 3B, at least a distortion in the main scanning direction (i.e., a vertical direction in the drawing) is corrected. Specifically, the page outline, the ruled line, and the character line in the scanned image are extracted such that each line is expanded in a mutually parallel direction.

Since the image reading apparatus 101 (FIG. 9) cannot precisely scan a character and an image in a vicinity of the page outline (i.e., within approximately 2 mm), a correction using the ruled line and the character line is required without using the page outline. Further, when an original document has a binary image, it is preferable not to use a page outline for an image scanning.

FIGS. 4A and 4B are schematic views illustrating when a correction is performed in the main direction by extracting a horizontal line from a vertically-written character line. Lines horizontally joining a beginning and an end of each line are extracted.

The horizontal virtual line extracted from the page outline, the ruled line, and the character line are hereinafter referred to as a reference line.

A correction in the sub-scanning direction depends on whether a scanner parameter (i.e., a position of an optical axis of a scanner lens and a distance between the center of the lens and a contact glass) is known or unknown.

Figure 5A:
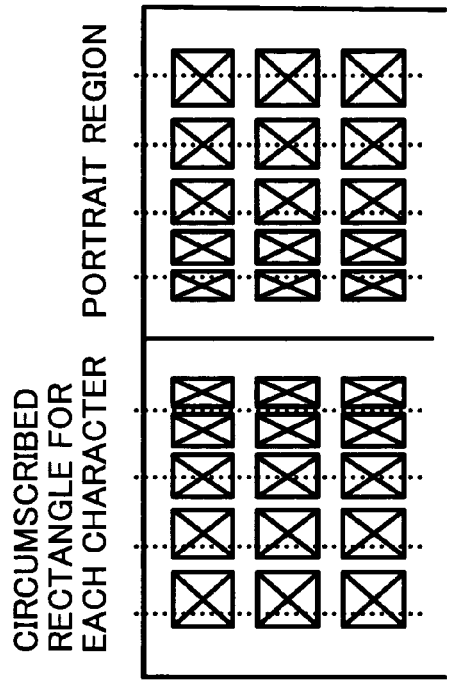
FIGS. 5A and 5B are schematic views of a correction in a sub-scanning direction when a scanner parameter is unknown.
Figure 5B:
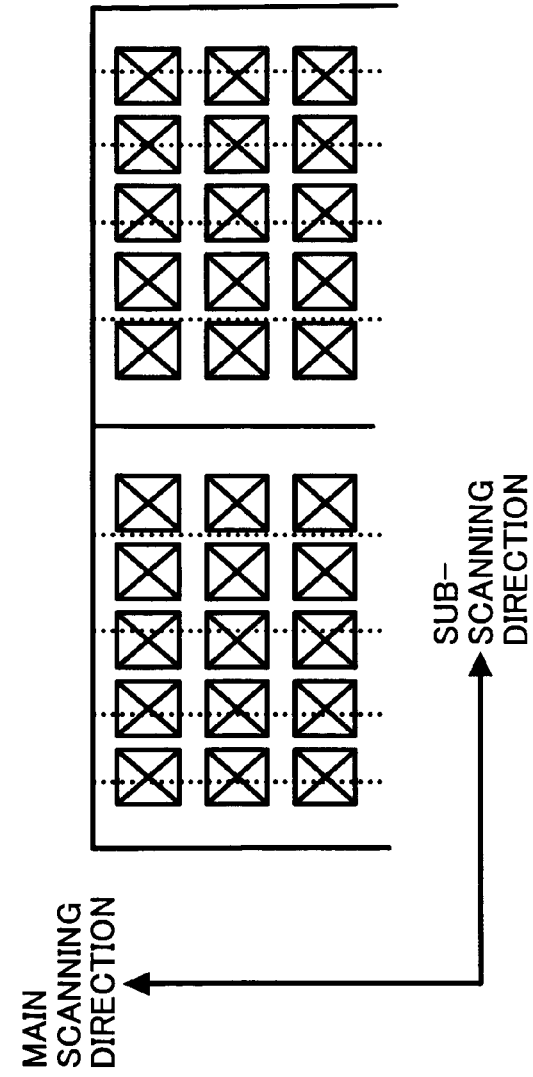

FIGS. 5A and 5B are schematic views of a correction in a sub-scanning direction when a scanner parameter is unknown. A character circumscribing rectangle is extracted from the scanned image after the correction in the main scanning direction is completed. The character circumscribing rectangle is well-known in character recognition technology. FIG. 5A is a schematic view illustrating an extracted character circumscribing rectangle. That is, the rectangle near a binding portion has a horizontal length shorter than a vertical length. This means that the rectangle shrinks in the sub-scanning direction. When the scanner parameter is unknown, an image is divided into a portrait region in the form of bars or strips and is expanded in the sub-scanning direction so that an average of a width and depth of the character circumscribing rectangle in each portrait region is equal (see FIG. 5B).

In the Japanese writing system, there are two character sizes, single-width and double-width characters. Single-width characters represent numbers and alphabets. Double-width characters represent "kana" (i.e., Japanese system of syllabic writing) and "kanji" (i.e., Chinese characters). When a document is scanned, the scanned image includes an undistorted portion having a double-width character and a portion in a vicinity of a binding having a single-width character. In this case, the single-width character tends to be expanded to the double-width character. In order to avoid this, a correction in the sub-scanning direction is not required when a parameter is unknown.

Figure 6A:
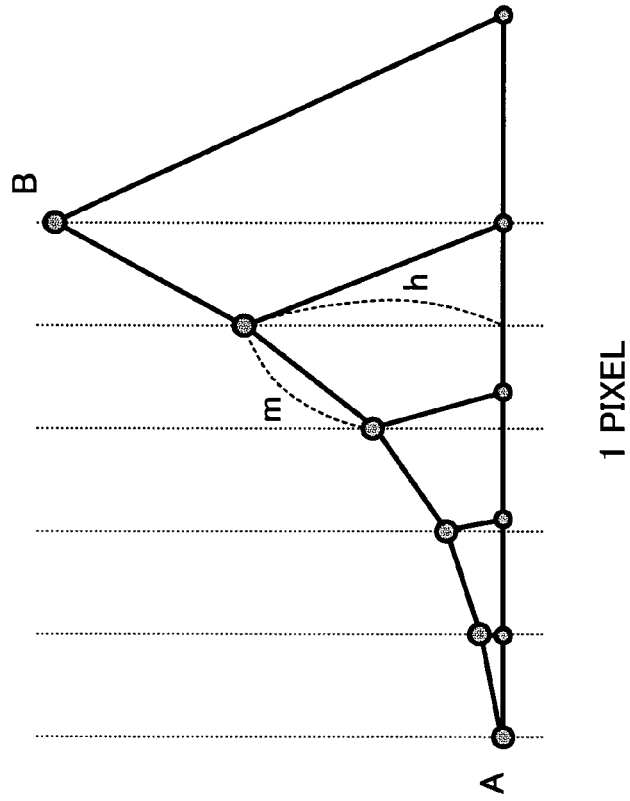
FIGS. 6A and 6B are schematic views of a correction in a sub-scanning direction when a scanner parameter is known.
Figure 6B:
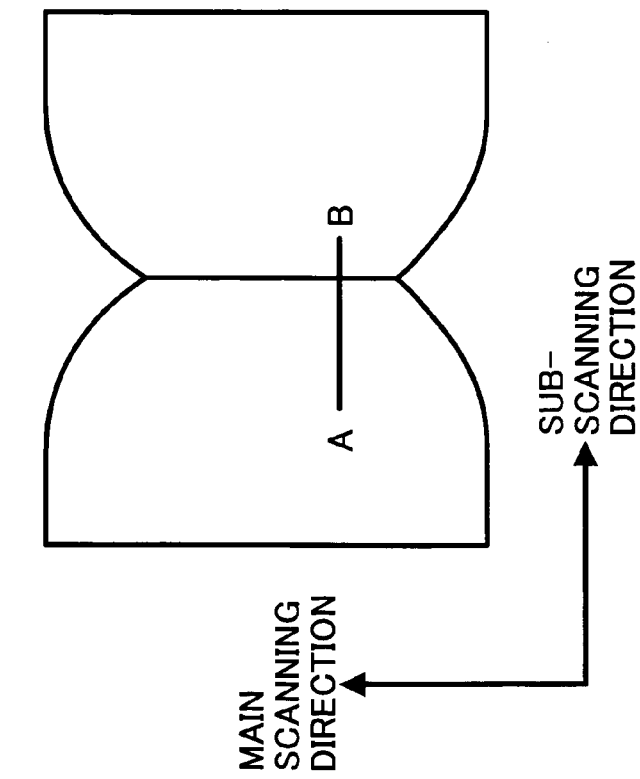

FIGS. 6A and 6B are schematic views illustrating a correction in a sub-scanning direction when a scanner parameter is known. FIG. 6B shows the A-B section in an uncorrected scanned image illustrated in FIG. 6A. When a scanner parameter is known, a height h (i.e., a rising amount) is obtained from a distance from the contact glass to a surface of the original document depending on a curvature of the reference lines such as the page outline, the ruled line, and the character line. As shown in FIG. 6B, one pixel in a sub-scanning direction is expanded by m times and is increased in this way. One exemplary approach is described in Japanese Laid-Open Patent Application Publication No. 2003-076389.

Figure 7A:
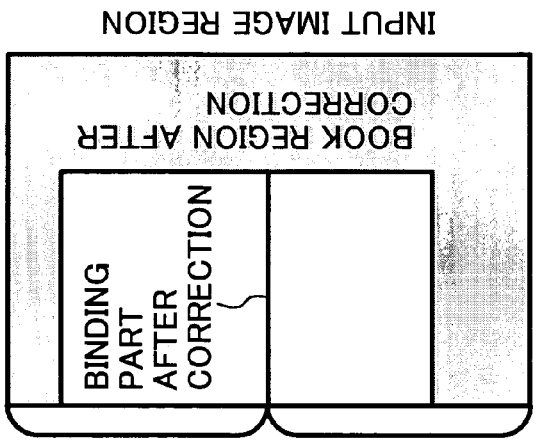
FIGS. 7A-7D are schematic views illustrating when a corrected image varies in size and a book region is stored in an input image region after a correction process is completed.
Figure 7B:
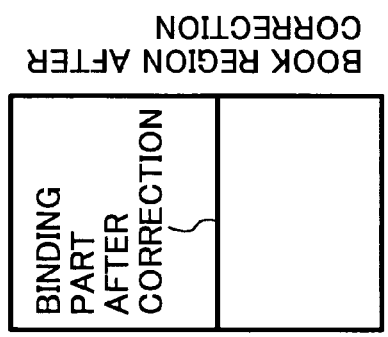
Figure 7C:
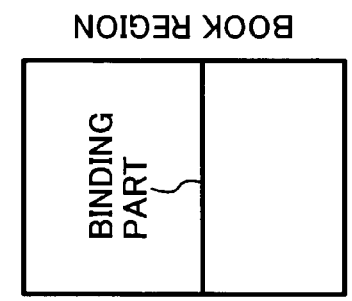
Figure 7D:
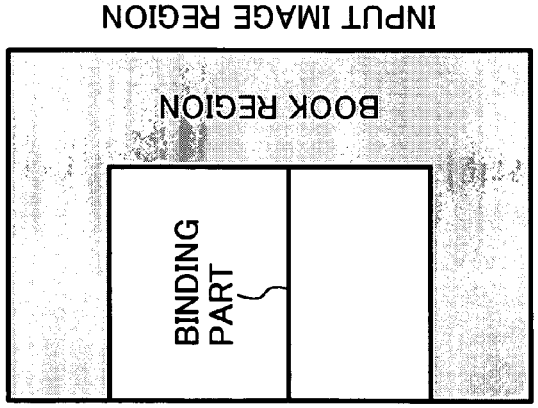
Figure 8A:
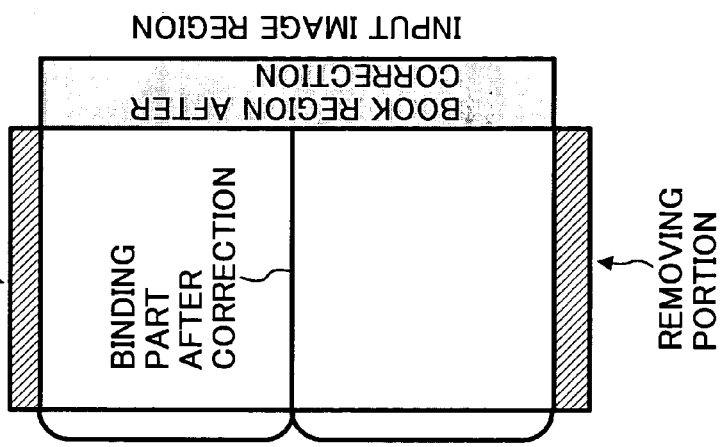
FIGS. 8A-8D are schematic views illustrating when a corrected image varies in size and a book region protrudes from an input image region after a correction process is completed.
Figure 8B:
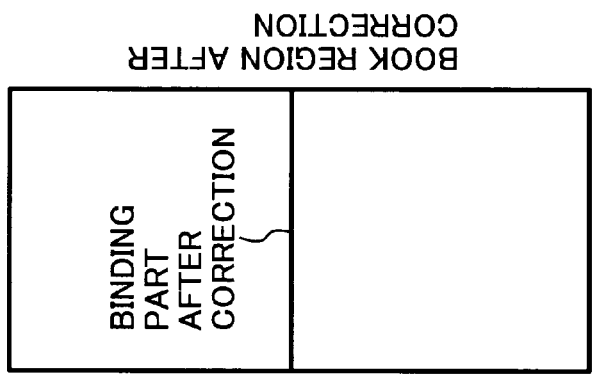
Figure 8C:
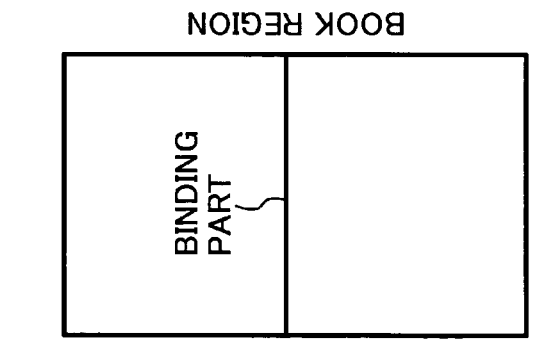
Figure 8D:
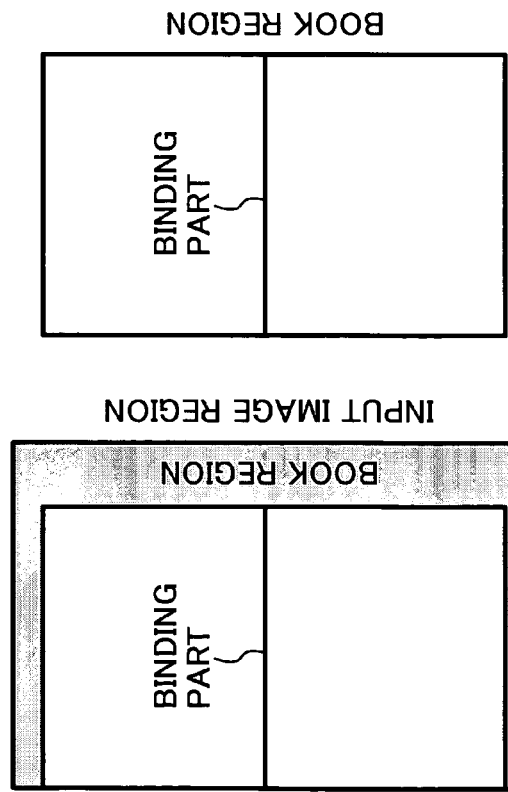

FIGS. 7A-7D and 8A-8D are schematic views illustrating variations in a shape of each image when an input image is corrected. In an image output, it is preferable to select whether or not the input image has the same size as an output image. When the input image does not have the same size as an output image, an image having a corrected book region is output (see FIGS. 7C and 8C). When the input image has the same size as an output image, an image having a corrected book region is reallocated in an input image region and output (see FIGS. 7D and 8D). At this time, a corrected binding position coincides with a center line in parallel to a main scanning direction of an input image region. Subsequently, protruding portions of the corrected book region are removed from the input image region. FIG. 7D shows an example of the corrected book region included in the input image region. FIG. 8D shows an example of the corrected book region protruding from the input image region.

A structure of an image processing apparatus of the present invention to perform the above-mentioned image processing will now be described.

Figure 9:
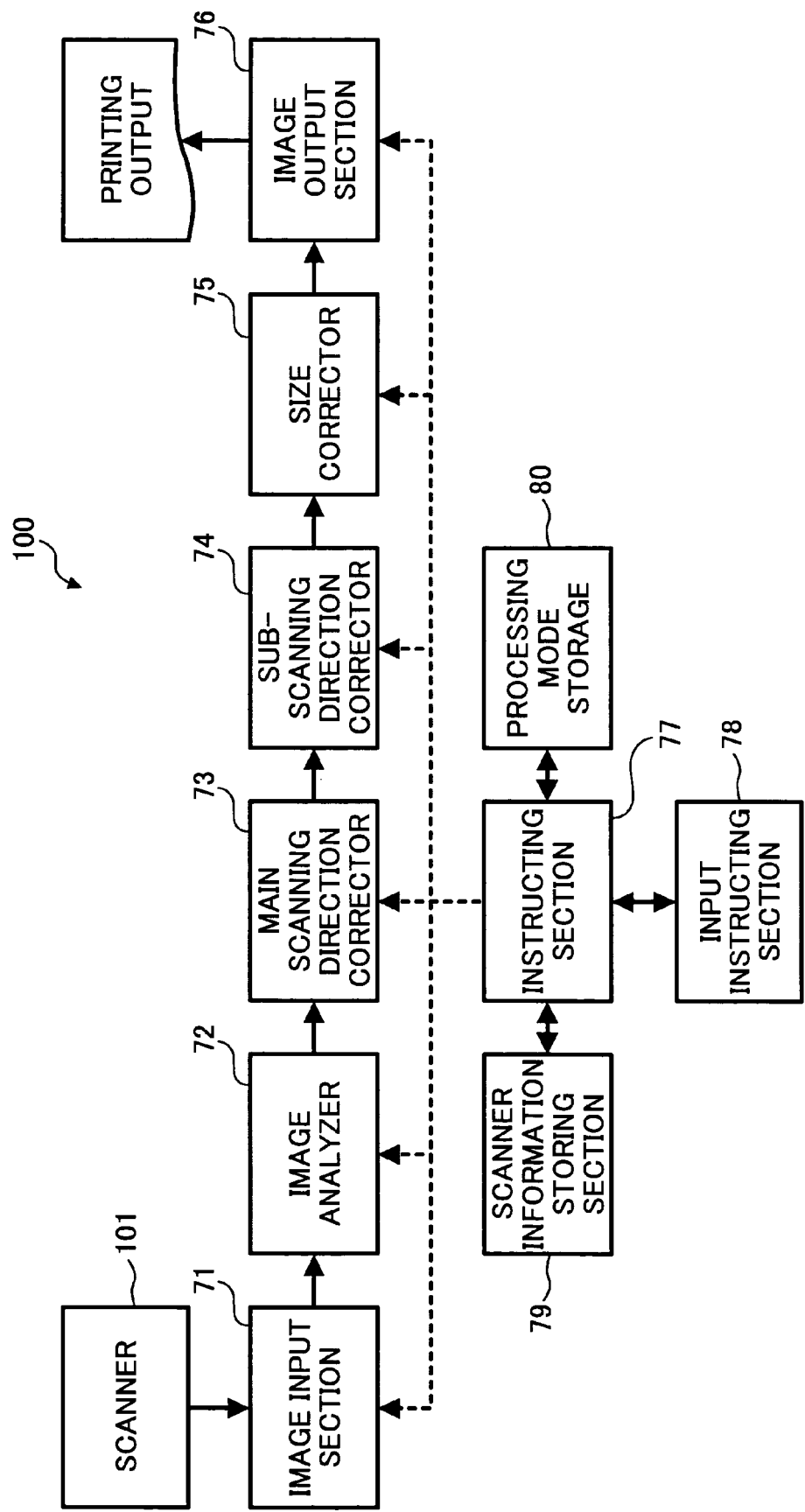
FIG. 9 is a block diagram of a function performed in the image processing apparatus of the present invention.

FIG. 9 is a block diagram illustrating a function which is performed in the image processing apparatus 100 of the present invention. In FIG. 9, an image input section 71 receives a scanned image having a distorted binding part from the image reading apparatus 101, such as a scanner. In addition, the image input section 71 receives a scanned image not only from the image reading apparatus 101 such as a scanner, but also from a network or a hard disk (not shown). An image analyzer 72 analyzes the scanned image to extract the above-mentioned reference line.

A reference line such as the page outline, the ruled line, and the character line can be extracted by converting the scanned image into a black dot histogram having a binary image. Since these techniques are well-known in the art, the detailed description thereon is omitted.

A main scanning direction corrector 73 (i.e., a first corrector) and a sub-scanning direction corrector 74 (i.e., a second corrector) use the above-mentioned method to correct distorted images. Alternatively, a book image corrector including the main scanning direction corrector 73 and the sub-scanning direction corrector 74 may be provided to correct distorted images. A size corrector 75 aligns a binding portion of an image to the center line after a correction process is completed. The size corrector 75 also adjusts an image size. An image output section 76 outputs a corrected image to a printer engine, a network, and a hard disk, which are not shown in the figure.

An instructing section 77 captures an image input from an input instructing section 78 such as a touch panel and the like. The instructing section 77 also stores instruction data of each process such as an image distortion correction, a size correction, and an image output to a processing mode storage 80 (i.e., a second memory). The instructing section 77 stores information about a scanner described as a scanner parameter into a scanner information storing section 79 (i.e., a first memory) to reference the information as desired. The scanner information storage 79 is preferably formed with memory such as a nonvolatile random access memory (RAM) whose contents are saved when a device is turned off. It should be understood that the scanner parameter is a unique numerical value to the image reading apparatus 101 (i.e., a scanner 101) so that the scanner parameter may be set when a scanner 101 connects to the image processing apparatus 100.

Figure 10:
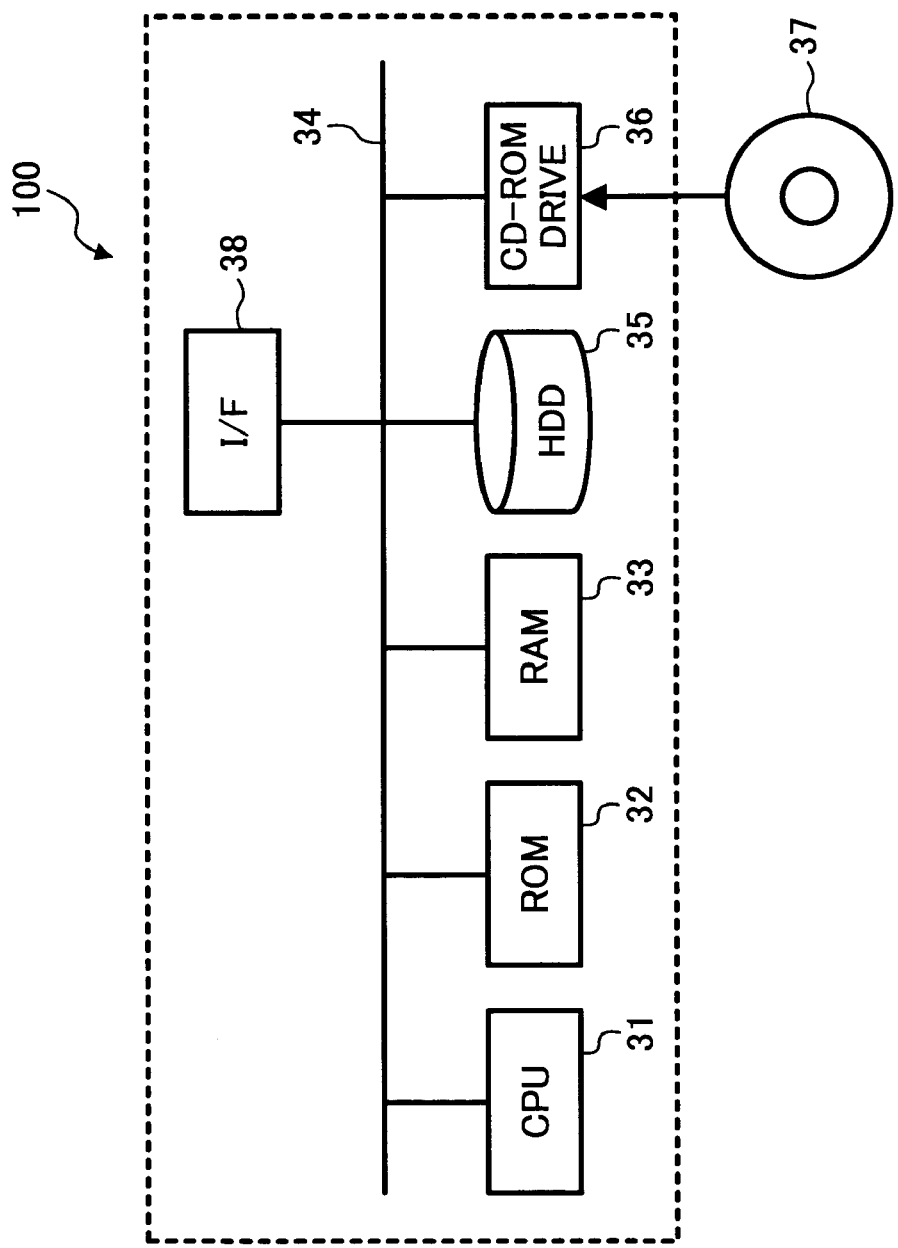
FIG. 10 is a hardware configuration implementing the image processing function of the present invention.

FIG. 10 shows a hardware configuration implementing the image processing function shown in FIG. 9. As shown in FIG. 10, the image processing apparatus 100 has a CPU (central processing unit) 31 which centrally controls components connected to it. This CPU 31 is connected to a ROM (read only memory) 32 which stores BIOS, and so on, a RAM (random access memory) 33 which serves as a work area for the CPU 31, and a bus 34. These components comprise a micro computer. Further, the bus 34 is connected to a HDD 35 which stores a control program, a CD-ROM (Compact Disc) drive 36 which reads a CD-ROM 37 and an interface (I/F) 38 through which the CPU 31 communicates with the printer part and a network.

The CD-ROM 37 as shown in FIG. 10 is one of the recording media of the present invention and stores a predetermined control program. The CPU 31 reads the control program stored on the CD-ROM 37 through the CD-ROM drive 36 and then installs it to the HDD 35. This program enables the main control unit 100 to perform various processes which are described later. Further, it is possible to use various kinds of optical discs such as DVD's, various kinds of magnet-optical discs, various kinds of magnet discs such as flexible discs, various kinds of semiconductor memories, and so on, as well as the CD-ROM 37 as the recording media. It is also possible to install the program, which is downloaded through networks such as the Internet, to the HDD 35. In this case, the recording media which store the programs on a server side are also the recording media for recording image processing programs according to the present invention. The program may be executed under a predetermined OS (Operating System) or the OS may execute a part of the processes in the program, as described later. Further, the program may be included in a group of program files which construct application programs such as word processing software and an operating system, and so on.

Processes which are executed by the CPU 31 provided in the image processing apparatus 100 under the control of the control program will now be described.

Figure 11:
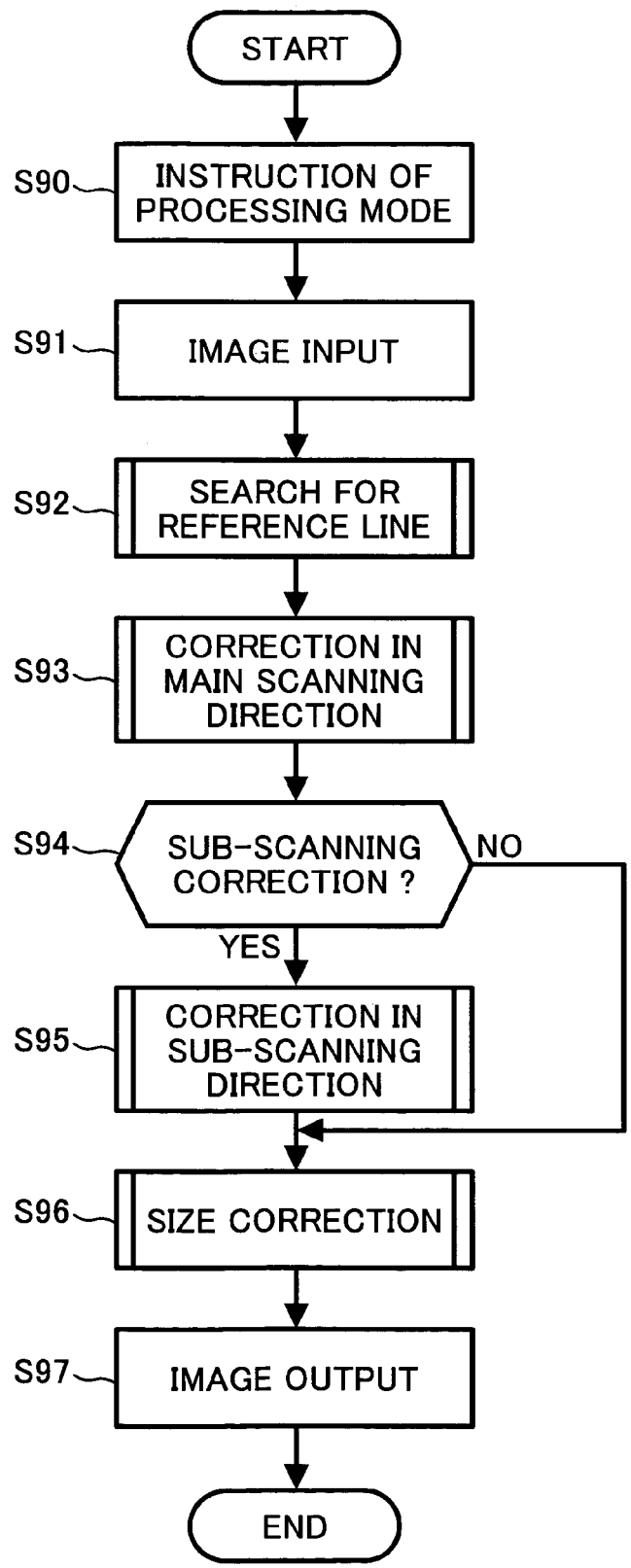
FIG. 11 is a schematic flowchart of an image distortion correction process for a scanned image according to the present invention.

FIG. 11 shows a schematic flowchart of the distortion correction process for the scanned image according to the present invention. After a process of correction is completed, step S90 performs processing mode instructions such as an image scan method, a reference line extraction method, a correction in a sub-scanning direction, and an image alignment. For example, when a scanner 101 connected to an image processing apparatus 100 scans an image, a scan option is used to select a color mode or monochromatic mode. When the scanned image is monochromatic, a binary image or a multi-value image is specified. In practice, instructions such as a resolution and a scan region are required. However, the description is limited primarily to sections to which the present invention is related.

When a reference line is extracted, an extraction of a page outline, a correction of a sub-scanning direction, a center-aligned image after a process of correction is completed, and an output same size as an original document are instructed. In this step, the processing mode is initially set, however, it may be set in the middle of the process other than information scanned by the scanner.

In step S91, the scanned image is input. Alternatively, it is also possible to input the scanned image from an image file which has already been scanned. In this case, scanner information is not included in the image file so that the scanner parameter is not used to correct the image. In step S92, a reference line is extracted. In step S93, the extracted reference line is used to perform a correction of the image in a main scanning direction. In step S94, the correction of the image in a main scanning direction is checked. In step S95, if a correction is instructed, a correction of the image in a sub-scanning direction is performed. In step S96, if a correction is not instructed, a size correction is performed without the correction in a sub-scanning direction. The correction result is stored in a hard disk or is sent to a printer engine for printout.

Figure 12:
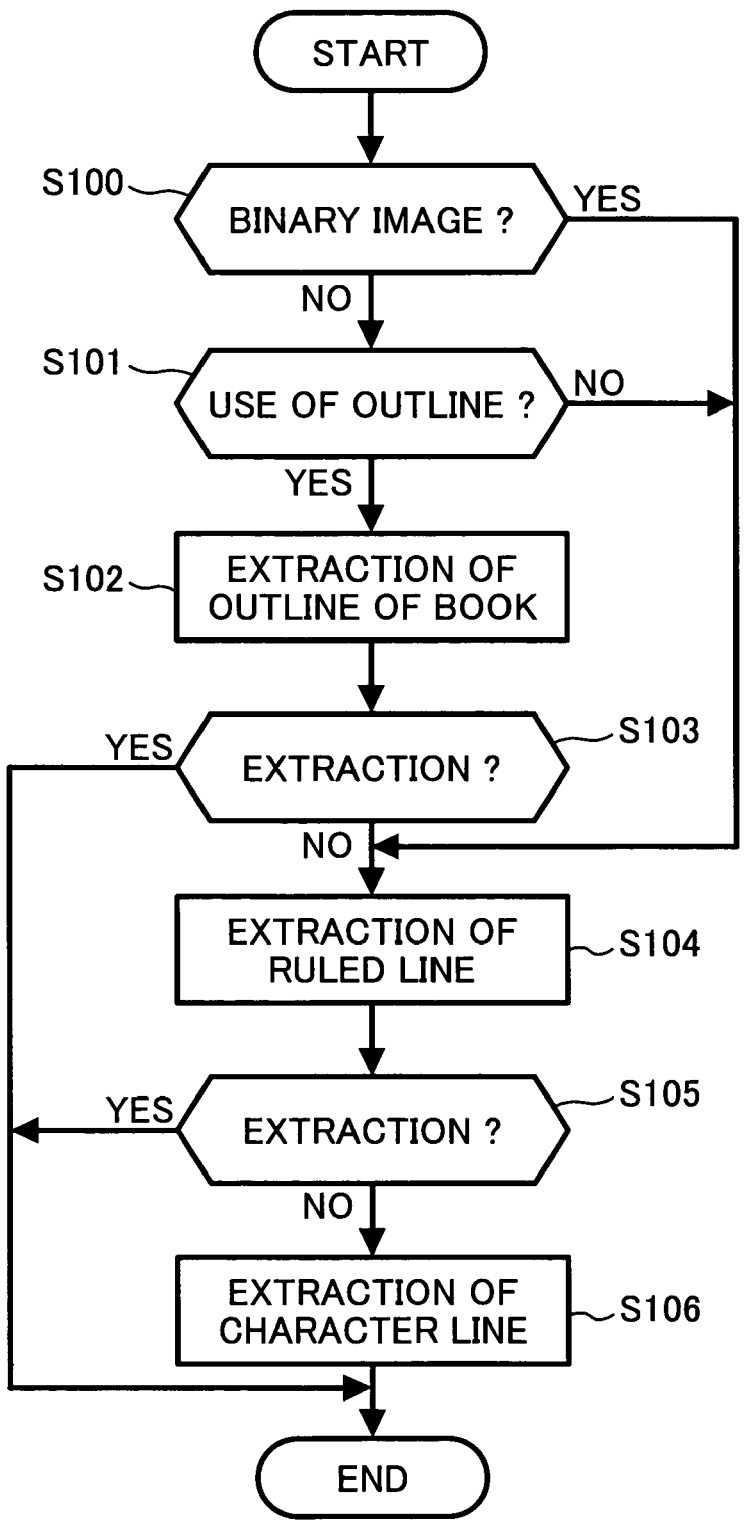
FIG. 12 is a flowchart illustrating a detailed description of a reference line searching according to the present invention.

FIG. 12 is a flowchart illustrating a detailed description of a reference line searching (step S92) in FIG. 11.

If a binary image is selected in a processing mode (Yes in step S100), or if a page outline is not selected (No in step S101), the process proceeds to a ruled line extraction (step S104) without the process of a page outline extraction. Otherwise, the page outline is selected (step S102). Alternatively, the scanned image of a page outline, a ruled line, and a character line may be previously converted into a binary image to produce a histogram of a black pixel in each main scanning direction, which are not shown in this flowchart. Since the reference line is a vertical line against a binding portion (i.e., in a main scanning direction), a long straight line represents a high frequency in the histogram. When a top and bottom outline of a page is extracted (Yes in step S103), the process is completed and returns to a start position. In this step, if two lines of the page outline are not extracted, one line may be extracted. Then, the process stores information about the extracted outline position and returns to the start position. This completes the process of the reference line extraction.

Figure 13:
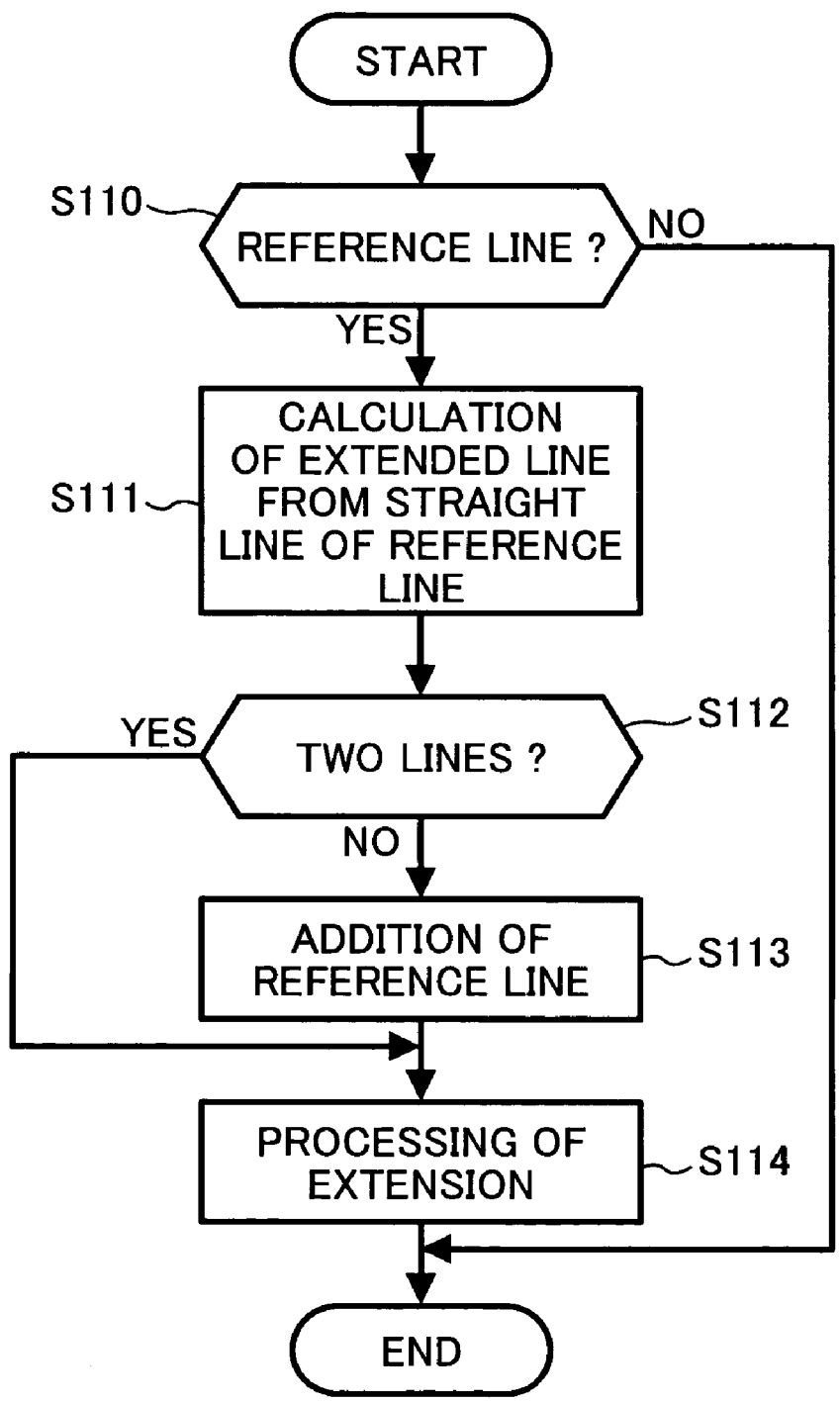
FIG. 13 is a flowchart illustrating a detailed description of an image distortion correction in a main scanning direction according to the present invention.

Next, a correction in a sub-scanning direction will be described. FIG. 13 is a flowchart illustrating a detailed description of a correction in a main scanning direction (step S93) in FIG. 11.

Control begins in step S110 in which a determination is made whether the reference line is extracted. If the reference line is not extracted, a correction is not made so that the process is completed. If the reference line is extracted, an extended line of a line portion of the reference line is determined (step S111). If two reference lines are extracted and two extended lines of which are determined (Yes in step S112), the process proceeds to an expansion process (step S114). If one reference line is extracted, another reference line is added (step S113).

In order to add a reference line, a line parallel to a binding passing a center line of the scanned image may be added. Alternatively, locus in a sub-scanning direction at a center position of a lens may be used. Since a straight line is added, the extended line needs not be determined.

Figure 14:
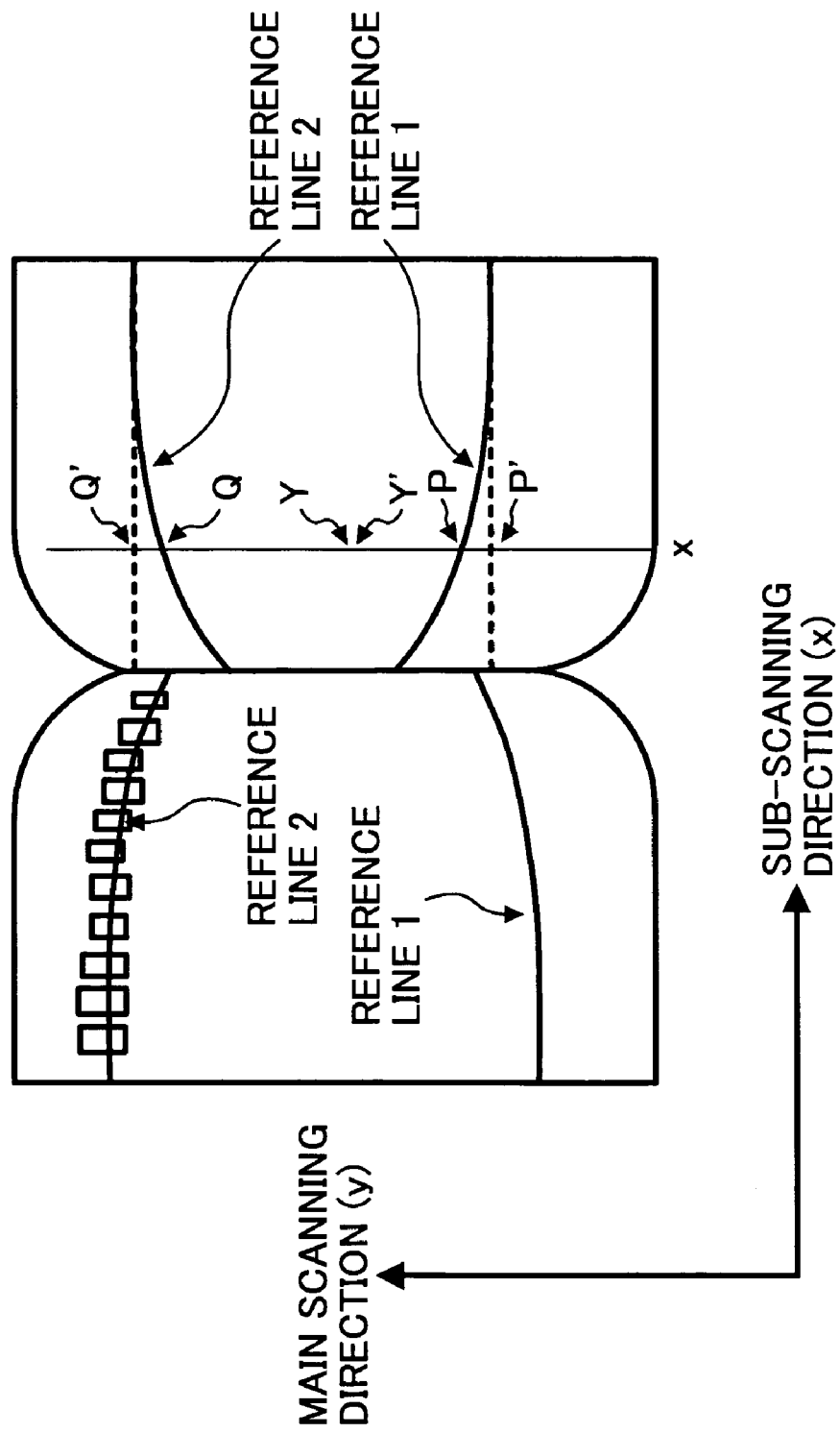
FIG. 14 is an explanatory view of an image distortion correction of a scanned image in a main scanning direction according to the present invention.

Next, in step S114, an extension process of the image in a main scanning direction is performed. FIG. 14 is an explanatory view of an image distortion correction of a scanned image in a main scanning direction. In FIG. 14, reference lines 1 and 2, prior to a correction process, are represented by solid lines. Reference lines 1 and 2, after a correction, are represented by dotted lines. The dotted lines, after a correction, are lines at which a straight line portion (i.e., a flat portion) of the reference lines 1 and 2 prior to the correction is extended. In a position X in a sub-scanning direction, a point P on the reference line 1 is corrected to a point P'. A point Y on the reference line 2 is corrected to a point Y'. When an arbitrary point Y in a main scanning direction in the position X is corrected to Y', the following relationship is obtained.

$$YP/YQ = Y'P'/Y'Q'$$

Therefore, when a position of each point in the main scanning direction is a point P, the point P is represented as P(y) to obtain the following equation.

$$(Y(y)-P(y))/(Y(y)-Q(y)) = (Y'(y)-P'(y))/(Y'(y)-Q'(y))$$

The above-equation is rearranged as follows.

$$Y(y) = ((P(y)-Q(y))/(P'(y)-Q'(y)))Y'(y) + (P'(y)Q(y)-P(y)Q'(y))/(P'(y)-Q'(y))$$

A pixel value of a position Y(y) prior to the correction is set to a pixel value of a position Y'(y) after the correction.

This represents a method for correcting the distortion in the main scanning direction.

Figure 15:
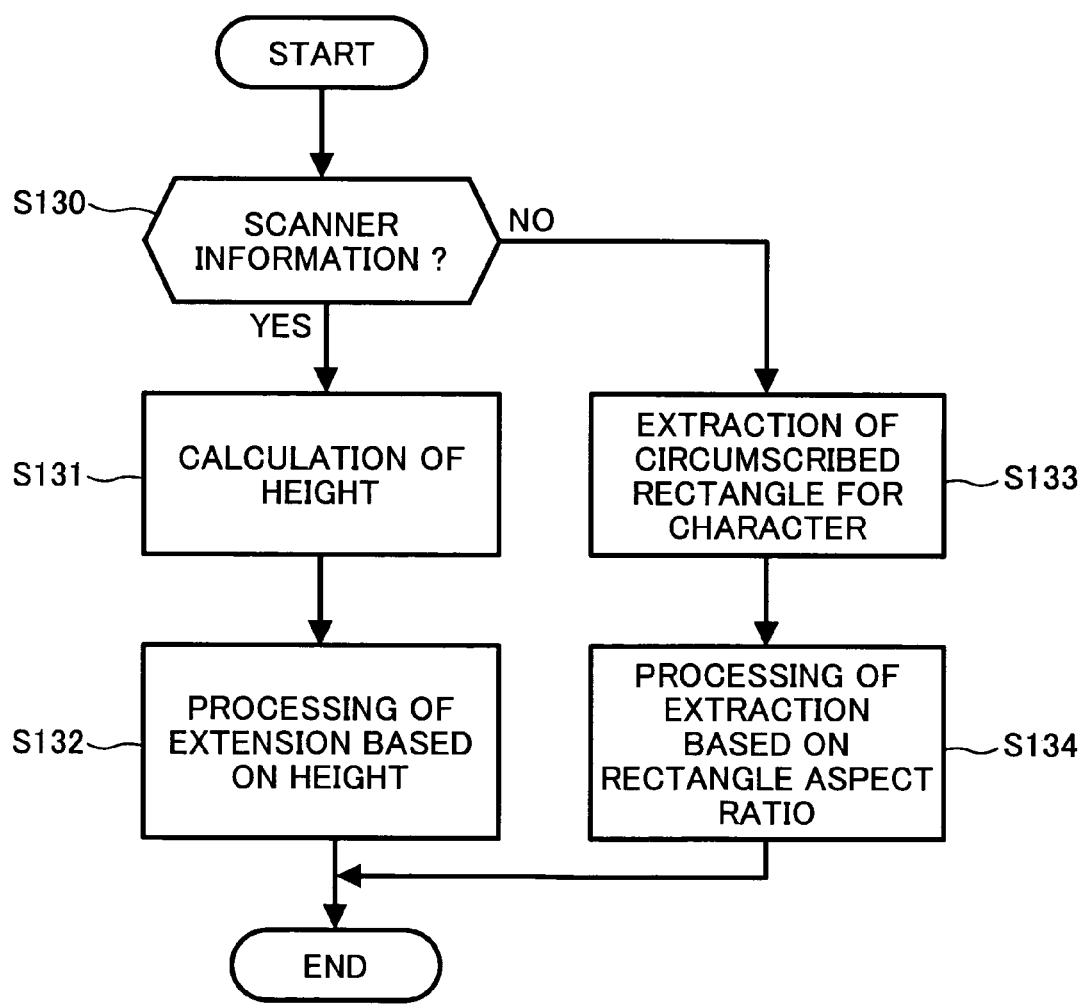
FIG. 15 is a flowchart illustrating a detailed description of an image distortion correction in a sub-scanning direction according to the present invention.

Referring now to FIG. 15, a correction in a sub-scanning direction will be described.

Figure 16:
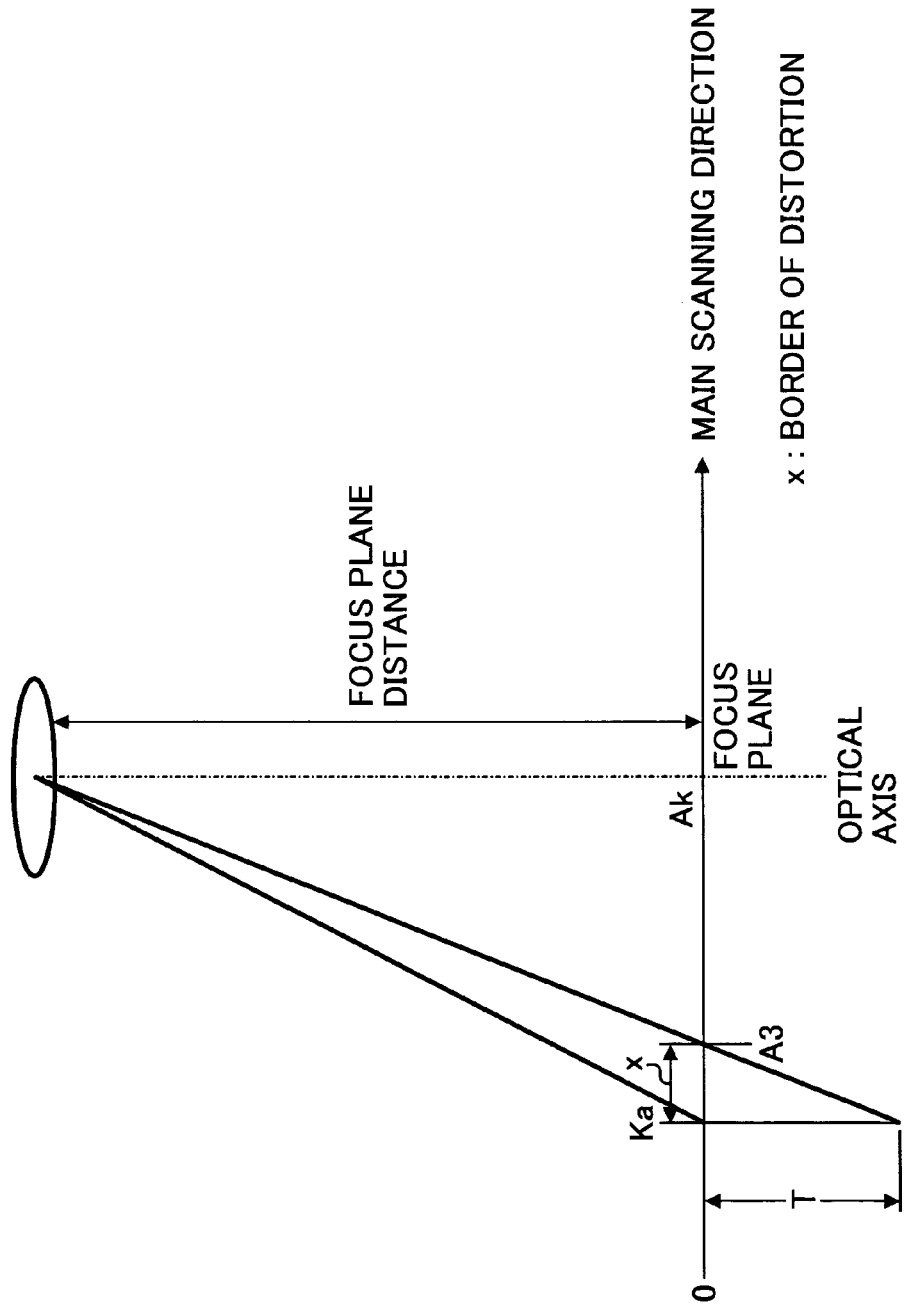
FIG. 16 is an explanatory view calculating a height between a contact glass and an original document according to the present invention.

FIG. 15 is a flowchart illustrating a detailed description of the correction in the sub-scanning direction (step S95) in FIG. 11. Control begins in step S130 in which a determination is made whether a scanner parameter is set to a scanner information storage 79. When the answer is Yes in Step 130, a height between the contact glass and the original document is calculated in all sub-scanning directions of curving reference lines. The height between the contact glass and the original document is calculated from optical positioning information shown in FIG. 16. Although FIG. 16 is inverted relative to an ordinary scanner, FIG. 16 shows a relationship between an arbitrary position and a virtual position of the original document in a sub-scanning direction. In FIG. 16, when the original document is floated by T, the image originally positioned at a point Ka is seen at a point A3 which is inside by a distance of X. This is because the image in a main scanning direction is obtained using a lens. When a scanner parameter (i.e., a position Ak of an optical axis and a focus plane distance) is determined, the following equation is obtained from Ka and A3.

(A3−Ak)/{(Ak−Ka)−(A3−Ak)} where T=a focus plane distance.

When thus-determined height between the contact glass and the original document is expanded to the plane as shown in FIG. 6B, the expansion process is performed based on the height between the contact glass and the original document (step S132).

On the other hand, when scanner information is not determined (No in step S130), the character circumscribing rectangle is extracted (step S133). An extraction process is performed based on a rectangle aspect ratio (in step S134). Further details for the above-mentioned extraction process are described in Japanese Laid-Open Patent Publication No. 2002-358514.

Figure 17:
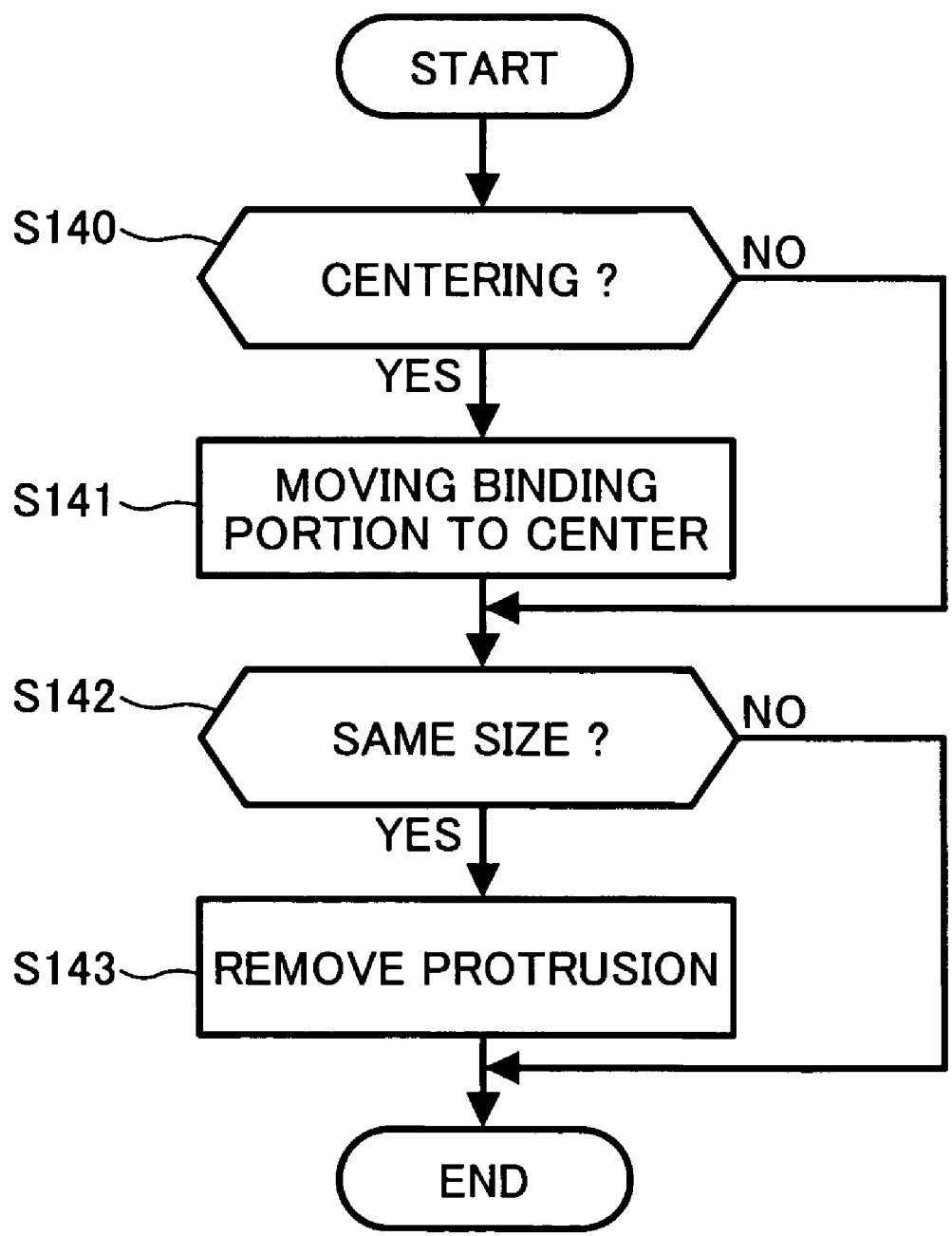
FIG. 17 is a flowchart illustrating a detailed description of a size correction.

The image after a correction of a distortion is completed include some errors except where a complete correction is performed. The errors are caused by misalignments of a binding portion (i.e., a center line) and a difference between an original document and an image size. FIG. 17 is a flowchart illustrating a detailed description of a size correction (step S96) in FIG. 11. When a central alignment is instructed by an instruction of the size correction stored in the processing mode storage 80 (Yes in step S140), the image is moved such that a binding portion of an original image is centrally aligned to an output image (Step 141). If an instruction is performed so as to output the same size as an original document (Yes in step S142), a protruding portion is removed (step S143). Alternatively, the above-mentioned instruction may be performed in, e.g., an adjustment mode for adjusting a size and a central alignment at the same time.

This specification may be conveniently implemented using a conventional general purpose digital computer programmed according to the teachings of the present specification, as will be apparent to those skilled in the computer art. Appropriate software coding can readily be prepared by skilled programmers based on the teachings of the present disclosure, as will be apparent to those skilled in the software art. The present specification may also be implemented by the preparation of application specific integrated circuits or by interconnecting an appropriate network of conventional component circuits, as will be readily apparent to those skilled in the art.

Numerous additional modifications and variations are possible in light of the above teachings. It is therefore to be understood that within the scope of the appended claims, the disclosure of this patent specification may be practiced otherwise than as specifically described herein.

The invention claimed is:

1. An image processing apparatus which includes an image reading apparatus, comprising:
    a first memory storing optical positioning information of the image reading apparatus;
    a book image corrector configured to perform an image correction based on reference data from an image read by the image reading apparatus when the image is of a book document, the book image corrector comprising:
        a first corrector configured to correct in a main scanning direction a distortion of the image of the book document based on the reference data;
        a second corrector having a plurality of different correction modes configured to correct a distortion of the image of the book document in a sub-scanning direction; and
        a selector configured to select one of the plurality of different correction modes of the second corrector based on the optical positioning information stored in the first memory.

2. The image processing apparatus according to claim 1, wherein the reference data includes a page outline, a ruled line, and a character line.

3. The image processing apparatus according to claim 1, wherein the book document is laid on the image reading apparatus such that a binding portion of the book document is parallel to the main scanning direction.

4. The image processing apparatus according to claim 1, wherein the plurality of different correction modes include a first mode which corrects a rising amount of an image portion of the image of the book document in a vicinity of the binding portion and a second mode which extracts a character circumscribing rectangle from the image of the book document and corrects the distortion based on a rectangle aspect ratio of the character circumscribing rectangle, and wherein the selector selects the first mode when the optical positioning information is stored in the first memory and the second mode when the optical positioning information is not stored in the first memory.

5. The image processing apparatus according to claim 1, further comprising a second memory storing a user selection mode, wherein the selector selects another one of the plurality of different correction modes which does not perform a distortion correction when the optical positioning information is not stored in the first memory.

6. The image processing apparatus according to claim 1, further comprising a second memory storing a user selection mode, wherein the selector selects a different one of the plurality of different correction modes which does not perform a correction of the distortion in the sub-scanning direction, regardless of whether the optical positioning information is stored in the first memory.

7. An image processing apparatus which includes an image reading apparatus, comprising:
    an image designating mechanism configured to designate a type of image of book document from the image reading apparatus;
    a reference data extractor configured to extract reference data obtained by the image of the book document;
    a book image corrector configured to extract reference data from an image read by the image reading apparatus, to analyze the image, and to perform an image correction when the image is determined as an image of a book document according to an analysis result, the book image corrector comprising:
        a first corrector configured to correct in a main scanning direction a distortion of the image of the book document based on the reference data extracted from the image of the book document; and
        a second corrector having a plurality of different correction modes configured to correct a distortion of the image of the book document in a sub-scanning direction, and
    wherein the reference data extractor extracts the reference data based on the type of image designated by the image designating mechanism.

8. The image processing apparatus according to claim 7, wherein the reference data includes a page outline, a ruled line, and a character line.

9. The image processing apparatus according to claim 7, wherein the book document is laid on the image reading apparatus such that a binding portion of the book document is parallel to the main scanning direction.

10. The image processing apparatus according to claim 7, wherein the reference data extractor extracts the ruled line and the character line other than the page outline as the reference data when the image designating mechanism designates a binary image.

11. An image processing apparatus which includes an image reading apparatus reading a book document having a binding portion, comprising:
   an image distortion corrector configured to perform a distortion correction of an image of a book document read by the image reading apparatus, the image distortion corrector comprising:
      a first corrector configured to correct in a main scanning direction a distortion of the image of the book document based on reference data extracted from the image of the book document; and
      a second corrector having a plurality of different correction modes configured to correct a distortion of the image of the book document in a sub-scanning direction; and
   an image adjustor configured to adjust an image of the book document after the process of the distortion correction is completed.

12. The image processing apparatus according to claim 11, wherein the book document is laid on the image reading apparatus such that a binding portion of the book document is parallel to the main scanning direction.

13. The image processing apparatus according to claim 12, wherein the image adjustor centrally aligns the binding portion of the book document to the image after the process of the distortion correction is completed.

14. The image processing apparatus according to claim 12, wherein the image adjustor equally adjusts a size of the corrected image to a size of the book document.

15. The image processing apparatus according to claim 12, wherein the image adjustor centrally aligns the binding portion of the corrected image and equally adjusts a size of an output image to the book document.

16. The image processing apparatus according to claim 11, further comprising an instructing mechanism which instructs an adjustment of a corrected image, wherein the image adjustor adjusts the image based on an instruction of the instructing mechanism.

17. An image processing apparatus which includes image reading means, comprising:
   first memory means for storing optical positioning information of the image reading means;
   correcting means for performing an image correction based on reference data from an image read by the image reading means when the image is of a book document, the book image corrector comprising:
      first correcting means for correcting in a main scanning direction a distortion of the image of the book document based on the reference data;
      second correcting means having a plurality of different correction modes for correcting a distortion of the image of the book document in a sub-scanning direction; and
   selecting means for selecting one of the plurality of different correction modes of the second correcting means based on the optical positioning information stored in the first memory means.

18. The image processing apparatus according to claim 17, wherein the reference data includes a page outline, a ruled line, and a character line.

19. The image processing apparatus according to claim 17, wherein the book document is laid on the image reading means such that a binding portion of the book document is parallel to the main scanning direction.

20. The image processing apparatus according to claim 17, wherein the plurality of different correction modes include first mode means for correcting a rising amount of an image portion of the image of the book document in a vicinity of the binding portion and second mode means for extracting a character circumscribing rectangle from the image of the book document and correcting the distortion based on a rectangle aspect ratio of the character circumscribing rectangle, and wherein the selecting means selects the first mode means when the optical positioning information is stored in the first memory means and the second mode means when the optical positioning information is not stored in the first memory means.

21. The image processing apparatus according to claim 17, further comprising second memory means for storing a user selection mode, wherein the selecting means selects another one of the plurality of different correction modes which does not perform a distortion correction when the optical positioning information is not stored in the first memory means.

22. The image processing apparatus according to claim 17, further comprising second memory means for storing a user selection mode, wherein the selecting means selects a different one of the plurality of different correction modes which does not perform a correction of the distortion in the sub-scanning direction, regardless of whether the optical positioning information is stored in the first memory means.

23. An image processing apparatus which includes image reading means, comprising:
   image designating means for designating a type of image of book document from the image reading means;
   reference data extracting means for extracting reference data obtained by the image of the book document;
   book image correcting means for extracting reference data from an image read by the image reading means, analyzing the image, and performing an image correction when the image is determined as an image of a book document according to an analysis result, the book image correcting means further comprising:
      first correcting means for correcting in a main scanning direction a distortion of the image of the book document based on the reference data extracted from the image of the book document; and
      second correcting means having a plurality of different correction modes for correcting a distortion of the image of the book document in a sub-scanning direction, and
   wherein the reference data extracting means extracts the reference data based on the type of image designated by the image designating means.

24. The image processing apparatus according to claim 23, wherein the reference data includes a page outline, a ruled line, and a character line.

25. The image processing apparatus according to claim 23, wherein the book document is laid on the image reading means such that a binding portion of the book document is parallel to the main scanning direction.

26. The image processing apparatus according to claim 23, wherein the reference data extracting means extracts the ruled line and the character line other than the page outline as the reference data when the image designating means designates a binary image.

27. An image processing apparatus which includes an image reading means for reading a book document having a binding portion, comprising:

image distortion correcting means for performing a distortion correction of an image of a book document read by the image reading means, the image distortion correcting means comprising:
- a first correcting means for correcting in a main scanning direction a distortion of the image of the book document based on reference data;
- a second correcting means having a plurality of different correction modes for correcting a distortion of the image of the book document in a sub-scanning direction; and
- image adjusting means for adjusting an image of the book document after the process of the distortion correction is completed.

28. The image processing apparatus according to claim 27, wherein the book document is laid on the image reading means such that a binding portion of the book document is parallel to the main scanning direction.

29. The image processing apparatus according to claim 28, wherein the image adjusting means centrally aligns the binding portion of the book document to the image after the process of the distortion correction is completed.

30. The image processing apparatus according to claim 28, wherein the image adjusting means equally adjusts a size of the corrected image to a size of the book document.

31. The image processing apparatus according to claim 28, wherein the image adjusting means centrally aligns the binding portion of the corrected image and equally adjusts a size of an output image to the book document.

32. The image processing apparatus according to claim 27, further comprising instructing means for instructing an adjustment of a corrected image, wherein the image adjusting means adjusts the image based on an instruction of the instructing means.

33. An image processing method, comprising the steps of:
- storing optical positioning information of an image reading apparatus;
- reading an image of a book document;
- extracting reference data from an image read by the reading step;
- analyzing the image;
- selecting one of a plurality of different correction modes based on the optical positioning information stored in the storing step; and
- performing an image correction when the image is determined as an image of a book document according to an analysis result performed by the analyzing step, the performing step comprising the steps of:
  - first correcting in a main scanning direction a distortion of the image of the book document based on the reference data extracted from the image of the book document; and
  - second correcting a distortion of the image of the book document in a sub-scanning direction.

34. The image processing method according to claim 33, wherein the reference data includes a page outline, a ruled line, and a character line.

35. The image processing method according to claim 33, wherein the book document is laid on the image reading apparatus such that a binding portion of the book document is parallel to the main scanning direction.

36. The image processing method according to claim 33, wherein the plurality of different correction modes include a first mode which corrects a rising amount of an image portion of the image of the book document in a vicinity of the binding portion and a second mode which extracts a character circumscribing rectangle from the image of the book document and corrects the distortion based on a rectangle aspect ratio of the character circumscribing rectangle, and wherein the selecting step selects the first mode when the optical positioning information is stored in the storing step and the second mode when the optical positioning information is not stored in the storing step.

37. The image processing method according to claim 33, further comprising a memorizing step of storing a user selection mode, wherein the selecting step selects another one of the plurality of different correction modes which does not perform a distortion correction when the optical positioning information is not stored in the storing step.

38. The image processing method according to claim 33, further comprising a memorizing step of storing a user selection mode, wherein the selecting step selects a different one of the plurality of different correction modes which does not perform a correction of the distortion in the sub-scanning direction, regardless of whether the optical positioning information is stored in the storing step.

39. An image processing method, comprising the steps of:
- designating a type of image of book document from an image reading apparatus;
- reading an image of the book document;
- extracting reference data obtained by the image of the book document;
- selecting one of a plurality of different correction modes based on the optical positioning information stored in the storing step; and
- performing an image correction when the image is of a book document, said performing comprising the steps of:
  - first correcting in a main scanning direction a distortion of the image of the book document based on the reference data extracted from the image of the book document;
  - second correcting a distortion of the image of the book document in a sub-scanning direction; and
- wherein the extracting step extracts the reference data based on the type of image designated by the designating step.

40. The image processing method according to claim 39, wherein the reference data includes a page outline, a ruled line, and a character line.

41. The image processing method according to claim 39, wherein the book document is laid on the image reading apparatus such that a binding portion of the book document is parallel to the main scanning direction.

42. The image processing method according to claim 39, wherein the extracting step extracts the ruled line and the character line other than the page outline as the reference data when the image designating mechanism designates a binary image.

43. An image processing method, comprising the steps of:
- performing a distortion correction of an image of a book document read by an image reading apparatus, said performing comprising the steps of:
  - correcting in a main scanning direction a distortion of the image of the book document based on the reference data extracted from the image of the book document;
  - correcting a distortion of the image of the book document in a sub-scanning direction; and
- adjusting an image of the book document after the process of the distortion correction is completed.

44. The image processing method according to claim 43, wherein the book document is laid on the image reading apparatus such that a binding portion of the book document is parallel to the main scanning direction.

45. The image processing method according to claim 44, wherein the adjusting step centrally aligns the binding portion of the book document to the image after the process of the distortion correction is completed.

46. The image processing method according to claim 44, wherein the adjusting step equally adjusts a size of the corrected image to a size of the book document.

47. The image processing method according to claim 44, wherein the adjusting step centrally aligns the binding portion of the corrected image and equally adjusts a size of an output image to the book document.

48. The image processing method according to claim 43, further comprising an instructing step of instructing an adjustment of a corrected image, wherein the adjusting step adjusts the image based on an instruction of the instructing step.

49. A computer readable medium containing an image correction program, said program causing a computer to execute an image correction according to a method, comprising the steps of:

storing optical positioning information of an image reading apparatus;

reading an image of a book document;

extracting reference data from an image read by the reading step;

analyzing the image;

selecting one of a plurality of different correction modes based on the optical positioning information stored in the storing step; and performing an image correction when the image is determined as an image of a book document according to an analysis result performed by the analyzing step, the performing step comprising the steps of:

first correcting in a main scanning direction a distortion of the image of the book document based on the reference data extracted from the image of the book document; and second correcting a distortion of the image of the book document in a sub-scanning direction.

50. A computer readable medium storing a program of an image correction causing a computer to execute an image correction according to a method according to any one of claims 33 to 48.

* * * * *